United States Patent
Albrecht et al.

(10) Patent No.: US 10,627,539 B2
(45) Date of Patent: Apr. 21, 2020

(54) OPTOELECTRONIC SENSOR SYSTEM

(71) Applicant: SICK AG, Waldkirch/Breisgau (DE)

(72) Inventors: Roland Albrecht, Denzlingen (DE); Johannes Eble, Waldkirch (DE); Eva-Maria Kriener, Freiburg (DE)

(73) Assignee: SICK AG, Waldkirch/Breisgau (DE)

( * ) Notice: Subject to any disclaimer, the term of this patent is extended or adjusted under 35 U.S.C. 154(b) by 50 days.

(21) Appl. No.: 16/124,425

(22) Filed: Sep. 7, 2018

(65) Prior Publication Data

US 2019/0079212 A1    Mar. 14, 2019

(30) Foreign Application Priority Data

Sep. 11, 2017    (DE) .................. 10 2017 120 877

(51) Int. Cl.
*G01V 8/14* (2006.01)
*G01V 8/12* (2006.01)

(52) U.S. Cl.
CPC . *G01V 8/14* (2013.01); *G01V 8/12* (2013.01)

(58) Field of Classification Search
CPC ..................................................... G01V 8/14
See application file for complete search history.

(56) References Cited

U.S. PATENT DOCUMENTS

| | | | |
|---|---|---|---|
| 8,917,395 | B2 | 12/2014 | Dalgleish |
| 2002/0135748 | A1 | 9/2002 | Lapolice |
| 2016/0238698 | A1 | 8/2016 | Vuorenkoski-Dalgleish |

FOREIGN PATENT DOCUMENTS

| | | |
|---|---|---|
| DE | 1275913 B | 8/1968 |
| DE | 1297006 B | 6/1969 |

(Continued)

OTHER PUBLICATIONS

German Office Action 102017120877.1 dated Jul. 4, 2014.

(Continued)

*Primary Examiner* — Tony Ko
(74) *Attorney, Agent, or Firm* — Nath, Goldberg & Meyer; Jerald L. Meyer

(57) ABSTRACT

The present invention relates to an optoelectronic sensor system for detecting objects in a monitored zone having a light transmitter for transmitting light into the monitored zone along a transmitted light path, having a light receiver for receiving received light from the monitored zone that is remitted along a received light path in the direction of the light receiver from an object to be detected in the monitored zone or a reflector bounding the monitored zone, and having an objective arrangement arranged in front of the light transmitter and the light receiver. The transmitted light path and the received light path run spaced apart from one another at least in part sections facing the light transmitter and the light receiver respectively. It is proposed that the objective arrangement has a first objective region and a second objective region laterally spaced apart from the first objective region, wherein the transmitted light path runs through the first objective region and that the sensor system has a reception space provided between the objective arrangement, on the one hand, and the light transmitter and the light receiver, on the other hand, in which reception space at least one deflection element can selectively be introduced that is configured to deflect or define the received light path such that it runs through the first objective region with an introduced deflection element and through the second objective region with a deflection element not introduced.

22 Claims, 2 Drawing Sheets

(56) References Cited

FOREIGN PATENT DOCUMENTS

Figure 1:
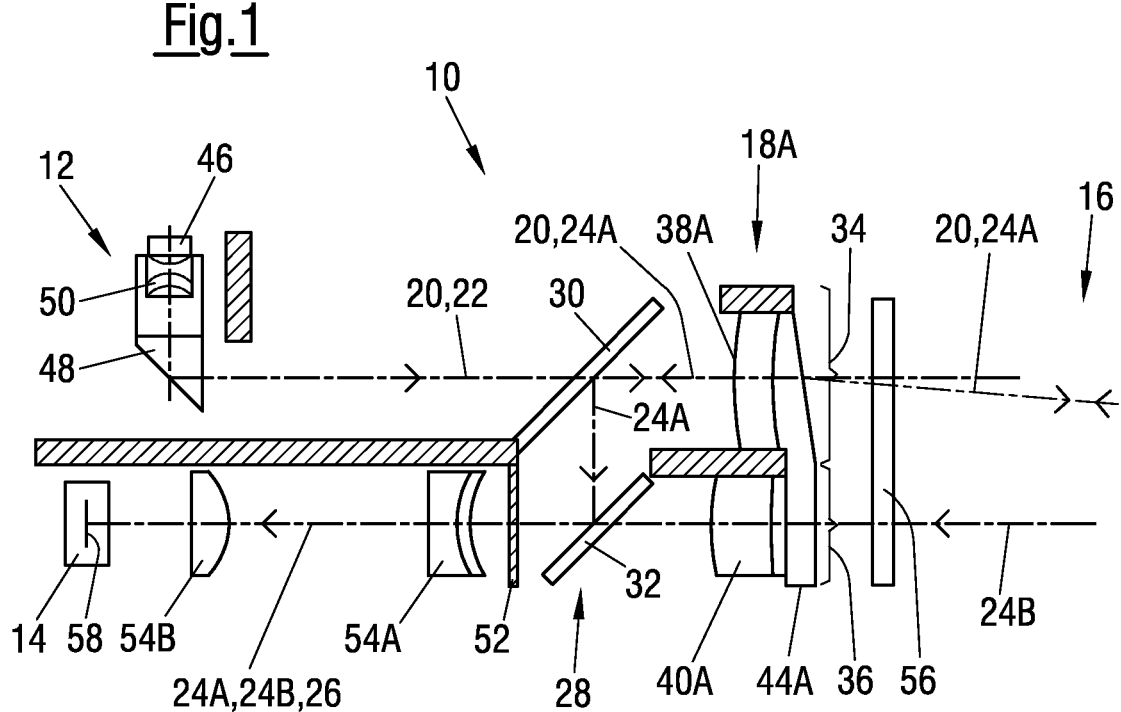

| DE | 102005013317 | * | 3/2005 | ............... G01V 8/12 |
| DE | 102005013317 A1 | | 10/2006 | |
| DE | 20023839 U1 | | 11/2006 | |
| DE | 202009007612 U1 | | 11/2010 | |
| DE | 202014009924 U1 | | 2/2015 | |
| EP | 0170008 A2 | | 2/1986 | |
| EP | 0083431 B1 | | 3/1986 | |
| EP | 0527326 A1 | | 2/1993 | |
| EP | 1832896 | * | 12/2007 | ............ G01S 17/02 |
| EP | 2226653 A1 | | 9/2010 | |
| EP | 3104198 A1 | | 12/2016 | |
| JP | WO2013/136824 | * | 1/2013 | ............ G02B 13/00 |

OTHER PUBLICATIONS

Extended Search Report dated Feb. 7, 2019 issued in corresponding European Application No. 18193406.8.
Extended Search Report dated Feb. 7, 2019 issued in corresponding European Application No. 18193414.2.

* cited by examiner

OPTOELECTRONIC SENSOR SYSTEM

The present invention relates to an optoelectronic sensor system for detecting objects in a monitored zone having a light transmitter for transmitting transmitted light into the monitored zone along a transmitted light path, having a light receiver for receiving received light from the monitored zone that is remitted along a received light path in the direction of the light receiver from an object to be detected in the monitored zone or a reflector bounding the monitored zone, and having an objective arrangement arranged in front of the light transmitter and the light receiver. The transmitted light path and the received light path run spaced apart from one another at least in respective part sections facing the light transmitter and the light receiver respectively.

Such sensor systems are configured e.g. as reflection light barriers or light scanners. The light used can here be any kind of light, that is light in the visible range, but also light in the infrared range or in the ultraviolet range.

The basic principle with light barriers and light scanners comprises a light transmitter transmitting light, in particular pulsed light, that is focused on the object to be detected via a collimator arrangement. With a light scanner, the light is remitted from a detected object. Some of the light is incident on the light receiver via a reception optics, with the light receiver being able to comprise one or more light sensitive elements, for example photodiodes, in an inline arrangement.

With a reflection light barrier, the transmitted light is remitted or reflected back from a reflector in the direction of the sensor system and is detected by the light receiver in a corresponding manner. Unlike a light scanner, an interruption of the transmitted light path and/or of the received light path is registered with a reflection light barrier.

Such optoelectronic sensor systems can be configured in different designs.

With a design usually called an autocollimation arrangement, the transmitted light path and the received light path are at least superposed in the monitored zone and are separated from one another in the interior of the sensor system with the aid of a beam splitter, i.e. the received light path is decoupled from the common light path and is directed in the direction of the light receiver.

With a design in a biaxial arrangement, the transmitted light path and the received light path run separately from one another in the interior of the sensor system and also in the monitored zone, i.e. the exit of the transmitted light path from the sensor system and the entry of the received light path into the sensor system are spatially spaced apart from one another. The biaxial arrangement is also known under the name "pupil division system". These terms are used as synonyms in the present text.

Depending on the purpose of the application, the two designs have different advantages and disadvantages. As a rule, an autocollimation arrangement is of advantage for the use of the sensor system as a reflection light barrier, whereas a biaxial arrangement is advantageous for a configuration as a light scanner since it has a much higher sensitivity in comparison with an autocollimation arrangement.

A reflection light barrier having geometrical beam splitting is known from DE 1 297 006 B, wherein the light transmitter and the light receiver are arranged in the proximity of a focus of the imaging optics. A separation of the transmitted light stream and of the received light stream is caused by wedge-shaped optical elements arranged in front of or behind the imaging optics.

In EP 0 083 431 B1, a reflection light barrier is described having a light source arrangement and optical elements for generating two beams directed along separate optical axes and having a photodetector for receiving light reflected back. The axis of the one beam runs substantially in parallel with the reception direction of the photodetector. The optical elements are configured and arranged such that the axis of the other beam includes an acute angle with that of the one beam.

EP 0 170 008 A2 relates to a light scanner or to a light barrier having a light transmitter and a light receiver in the same housing, having a plano-convex lens for bundling the transmitted light and for focusing the light reflected back, and having means for directing the light reflected back. The planar surface of the plano-convex lens is arranged at an inclination to a plane perpendicular to the axis of the light beam to prevent transmitted light reflected at the plano-convex lens is incident on the light receiver.

It is the object of the present invention to provide an optoelectronic sensor system that can be used in a versatile manner and that is simple to produce.

The solution is achieved by an optoelectronic sensor system having the features of claim 1.

It is proposed that the objective arrangement has a first objective region and a second objective region laterally spaced apart from the first objective region, wherein the transmitted light path runs through the first objective region and that the sensor system has a reception space provided between the objective arrangement, on the one hand, and the light transmitter and the light receiver, on the other hand, in which reception space at least one deflection element can selectively be introduced that is configured to deflect or define the received light path such that it runs through the first objective region with an introduced deflection elements and through the second objective region with a deflection element not introduced.

With an introduced deflection element, the transmitted light path and the received light path accordingly both run through the first objective region. In this configuration, the optical path of the sensor system in accordance with the invention corresponds to an autocollimation arrangement. When the deflection element is not introduced, the transmitted light path and the received light path run spaced apart from one another through the two different objective regions of the objective arrangement and also through the monitored zone. This configuration corresponds to a biaxial or pupil division arrangement. The sensor system in accordance with the invention can thus be converted in a simple manner from an autocollimation arrangement into a biaxial arrangement, and vice versa, only by introducing or removing one or more deflection elements.

In accordance with advantageous embodiments of the invention, at least those part sections of the transmitted light path and of the received light path that face the light transmitter and the light receiver respectively are spaced apart from one another, in particular in parallel, or re at angle, in particular a right angle, to one another. It is thereby ensured that the part sections run spatially separately from one another and that interference light is optically separated by suitable measures, for example partition walls between said part sections, to prevent an impairment of the sensor operation by interference light or the like. In a configuration with part sections extending in parallel, two deflection elements are required as a rule, with a more compact construction being able to be achieved, however. In a configuration in which the part sections run at an angle, in particular at a right angle, to one another, only one deflection element is necessary as a rule; however, a somewhat larger construction space has to be accepted.

In an exemplary configuration in which those part sections of the transmitted light path and of the received light path that face the light transmitter and the light receiver respectively run in parallel, two deflection elements are required as a rule, with the one deflection element being able to be configured as a beam splitter (beam splitter mirror) arranged in the combined transmitted light path/received light path and with the other deflection element being able to be configured as a deflection mirror that is arranged in the section of the received light path deflected by the beam splitter. The functions of the beam splitter and the deflection mirror can also be combined in a combined deflection element.

In another exemplary configuration in which said part sections run at a right angle to one another only one deflection element is required as a rule. In a configuration in which the transmitted light path is not deflected and in which the part section of the received light path facing the light receiver runs perpendicular to the transmitted light path, for example, a single deflection element can thus be provided that is configured as a beam splitter and that is introduced into the reception space, i.e. in this case into the combined transmitted light path/received light path running through the first objective region for an autocollimation arrangement. For a biaxial arrangement, the beam splitter is removed from the reception space, wherein in this case the received light path running through the second objective region has to be deflected by 90° in the direction of the light receiver. Both the beam splitter removed from the reception space and a deflection mirror provided for this purpose can be used here.

The sensor system can have further beam shaping, beam limiting and/or beam deflecting elements (e.g. lenses, diaphragms, mirrors, prisms) that can in particular be arranged between the reception space, on the one hand, and the light transmitter and/or the light receiver, on the other hand, and also between the reception space and the monitored zone. These further elements can in particular be identical with respect to their kind and/or their position for both configurations, i.e. for the autocollimation configuration and for the biaxial configuration. In other words, only the deflection element or elements has/have to be repositioned for the conversion between the two configurations, with, however, a replacement, removal, adding and/or repositioning of individual further elements, in particular also further deflection elements, not having to be precluded in principle.

The transmitted light path and the received light path advantageously coincide in the region of the objective arrangement when the at least one deflection element is introduced into the reception space. It is hereby ensured that the transmitted light path and the received light path not only run together through the first objective region of the objective arrangement, but also actually run parallax-free such as is desired in an ideal autocollimation arrangement.

In accordance with a first embodiment, the sensor system comprises at least one deflection element that is selectively insertable into the reception space. In this embodiment, the deflection element is accordingly inserted into or removed from the reception space for a change between the two configurations. An opening of the housing is necessary for a conversion as a rule.

In accordance with an alternative embodiment, provision is made that the sensor system comprises at least one deflection element that can be moved, in particular pivoted or displaced, between a deflection position and a release position and that is introduced into the reception space in the deflection position and releases the reception space in the release position. The movement of the deflection element can take place after an opening of the housing or also with the aid of suitable actuation elements that are led through the closed housing to the outside and do not require an opening of the sensor system. In general, powered drives can also be used to move the deflection element or elements so that, for example, a change of the configuration is possible in an electronic manner with the aid of a suitable control. The embodiment with a movable deflection element has the advantage that a change of the configuration is possible at any time and that the deflection element cannot be lost or damaged in a configuration of the sensor system as a biaxial arrangement since it is always located within the sensor system.

One or more further deflection elements can generally also be provided that can likewise be selectively inserted or moved. Fixedly installed deflection elements, i.e. deflection elements that cannot be removed or moved, can furthermore also be provided as long as they do not impede the change between the two configurations.

The deflection element can be configured as a beam splitter that is configured to transmit the transmitted light in a substantially uninfluenced manner and to deflect the received light by an angle, in particular by a right angle. A separation of the transmitted light path and of the received light path in the sensor system can be achieved in an inexpensive manner using such a beam splitter.

A further deflection element configured as a deflection mirror can advantageously be provided in addition to a deflection element configured as a beam splitter. The beam splitter is advantageously provided in the region of the transmitted light path, whereas the deflection mirror is arranged in the region of that received light path that is provided in a biaxial configuration.

In accordance with a further advantageous embodiment, the beam splitter and the deflection mirror are combined in an integral deflection element utilizing reflections at an outwardly applied coating or utilizing total reflections at an inner border surface.

The objective arrangement advantageously has a first focusing lens element in the first objective region and a second focusing lens element in the second objective region, with the lens elements having optical axes spaced apart from one another. The lens elements can be configured as concave-convex, plano-convex, or biconvex lenses, for example. It has proved to be advantageous if the convex side faces the light transmitter or the light receiver respectively. The incidence of interference light can hereby be reduced.

In accordance with an advantageous further development, the transmitted light path and the received light path run along respective optical axes, with the lens elements being arranged with respect to one another such that the spacing of the optical axes of the lens elements is smaller than the spacing of the optical axes of the transmitted light path and of the received light path in the region of the objective arrangement. With such an offset between the optical axes of the lens elements and of the light paths, the vertices of one or both lens elements as a rule do not coincide with the optical axis of the respective transmitted light path or received light path running through the lens element. It is thereby effected that the transmitted light path and/or the received light path run slightly at an inclination in comparison with an arrangement of the lens elements in which the optical axes of the lens elements coincide with the respective optical axis of the transmitted light path and of the received light path. This has the consequence that the transmitted light path and the received light path intersect within the monitored zone. In particular parallax errors are hereby avoided and the sensitivity of the sensor system is thereby increased.

In accordance with a further advantageous embodiment, the objective arrangement comprises at least one optical wedge element that is associated with the first objective region or with the second objective region and that is configured to deflect the transmitted light path or the received light path such that the transmitted light path and the received light path intersect within the monitored zone. A wedge element is therefore located in front of the first or second objective regions or lens elements, with the wedge element also being able to extend over both objective regions, with then a part section of the wedge element being able to be configured as wedge-shaped in front of one objective region and as plano-parallel in front of the other objective region. It is, however, alternatively also possible to arrange a wedge element in front of the first objective region and to arrange a further wedge element with an opposite inclination in front of the second objective region, with the two wedge elements naturally also being able to be integrated in a single component. The wedge element or elements, like the above-explained offset between the optical axes of the lens elements and of the light paths, effect an inclination of the course of the transmitted light path or received light path.

In general, both measures, i.e. the offset of the optical axes and the provision of one or more wedge elements, can be combined with one another. The wedge elements and/or the axial offset improve/improves the performance of the sensor system in the biaxial configuration, but are not absolutely necessary for the operation of the sensor system in the autocollimation configuration. The operation in the autocollimation configuration is, however, also not thereby impaired. A removal of the wedge element or elements or a lateral offset of the lens elements to cancel the inclination change of the transmitted light path or received light path would generally be possible, but is not necessary. It is rather ensured by a maintenance of the inclination change of the light paths that the sensor system does not have to be readjusted even on a change of the configuration.

The objective arrangement can both be assembled from individual elements, i.e. from individual lens elements and/or wedge elements, or can alternatively also be produced as an integral element. The above-named lens elements can be configured as an individual lens or also as a lens group comprising a plurality of individual lenses.

In accordance with a preferred embodiment, the sensor system is configured to generate a linear scanning spot in the monitored zone and the light receiver is configured to detect with spatial resolution an image of the scanning spot remitted by an object. Such a configured sensor system can in particular be used for edge detection, for example in the monitoring of web edges in the machining of web material or in the monitoring of rolled material on a reaching of a border diameter of the roll.

The linear scanning spot advantageously extends perpendicular to a plane that is defined by those part sections of the transmitted light path and of the received light path that face the light transmitter and the light receiver respectively. The scanning spot here extends in parallel with the inclination axis of the deflection element or elements, i.e. in parallel with the axis about which the deflection element or elements is/are tilted with respect to the respective light path. With this alignment, the greatest extent of the deflection element, i.e. of the beam splitter and/or of the deflection mirror, only has to be as large as the extent of the scanning spot image on the incidence on the deflection element. Otherwise, e.g. with a perpendicular extent of the scanning spot with respect to the inclination axis of the deflection element or elements and with an assumed tilt of the beam splitter or of the deflection mirror of, for example, 45° with respect to the optical axes of the light paths, the largest dimension of the deflection element can be 1.41 times larger than the extent of the scanning spot. In the named advantageous embodiment, relatively small deflection elements can thus be used, which is of advantage both with respect to interfering vibrations of the deflection elements and to a compact construction form of the sensor system. A linear reception element then advantageously extends in the same direction as the scanning spot.

This special embodiment of a sensor system with a linear scanning spot for a spatially resolved detection of the remitted scanning spot in which the linear scanning spot extends perpendicular to a plane that is defined by the part sections of the transmitted light path and of the received light path that face the light transmitter and the light receiver respectively (that is in particular having the features of the characterizing portions of claims 11 and 12) can advantageously also be combined in an optoelectronic sensor system having the features of the preamble of claim 1 without it being possible to remove the at least one deflection element from the received light path. The advantageous alignment of the linear light spot with respect to the inclination of the at least one deflection element can in the respect also advantageously be used in an autocollimation system that cannot be converted into a pupil division system by the removal of deflection elements from the received light path. To this extent, independent protection is also claimed for such an autocollimation system (claim 13).

Further advantageous embodiments of the invention result from the dependent claims, from the description and from the drawings.

Figure 2:
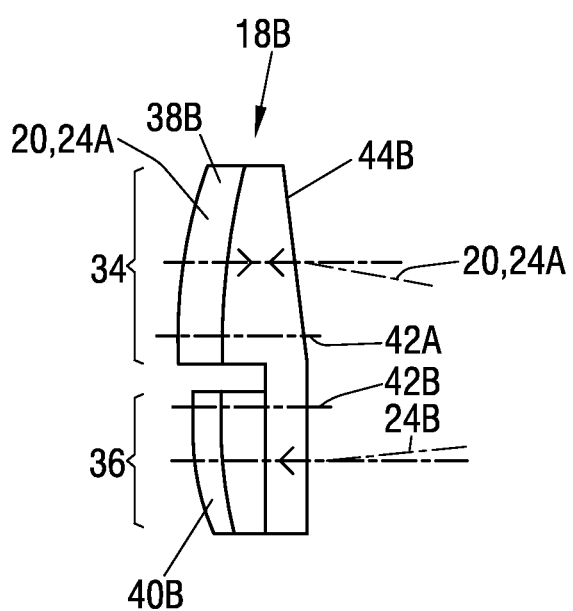
Figure 3:
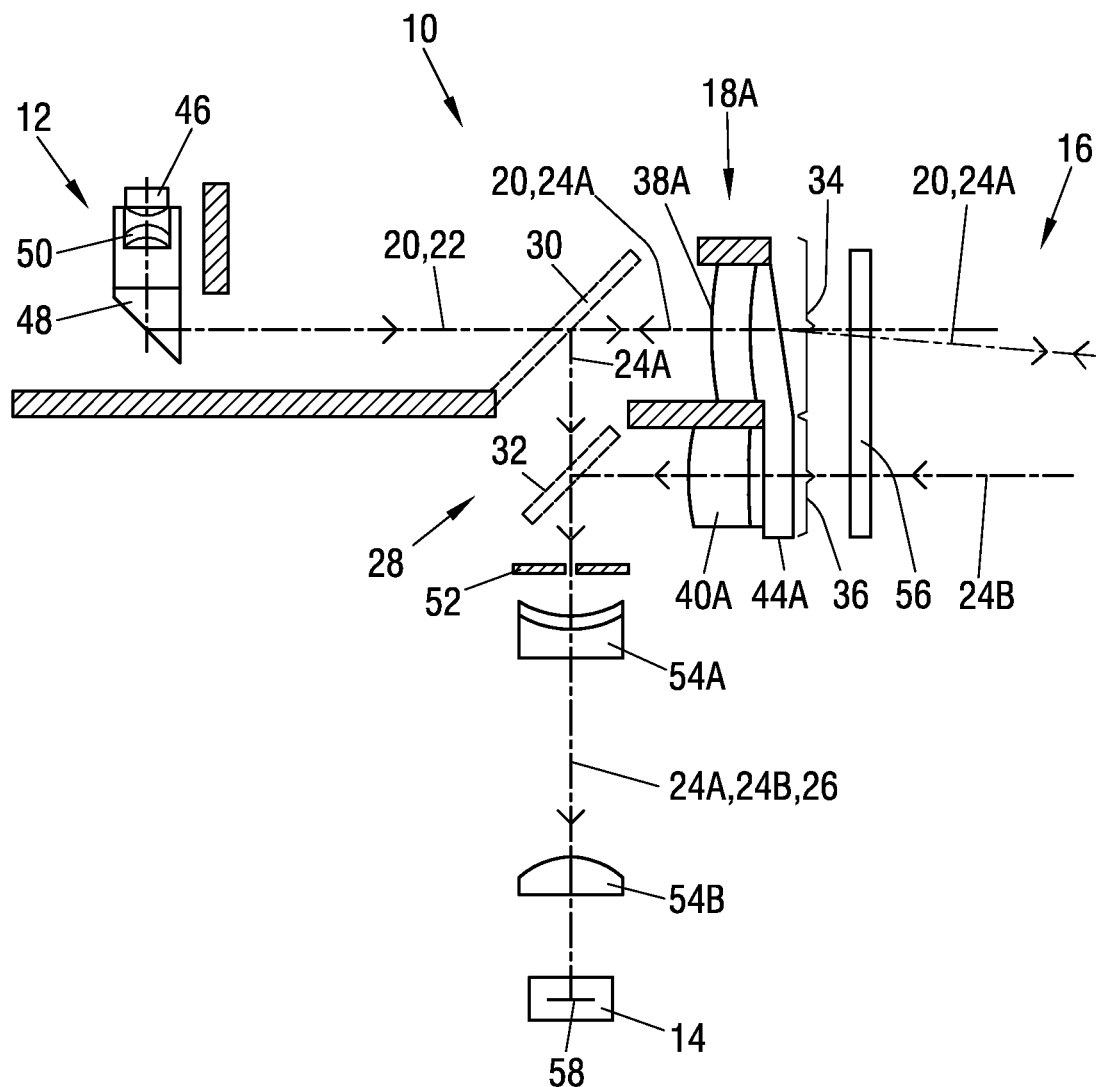

The invention will be described in the following by way of example with reference to the drawings. There are shown:

FIG. 1 a schematic representation of an optoelectronic sensor system in accordance with the invention;

FIG. 2 a cross-section through an objective arrangement for the sensor system of FIG. 1 in accordance with an alternative embodiment; and FIG. 3 a schematic representation of a modified embodiment of an optoelectronic sensor in accordance with the invention.

FIG. 1 shows the optical components and optical paths of an optoelectronic sensor system 10 for detecting objects in a monitored zone 16 in a schematic representation and not to scale. The sensor system 10 comprises a light transmitter 12 for transmitting light into the monitored zone 16 along a transmitted light path 20, a light receiver 14 for receiving received light from the monitored zone, and an objective arrangement 18A arranged in front of the light transmitter 12 and the light receiver 14. A light permeable front screen 56 can be provided between the objective arrangement 18A and the monitored zone 16.

The light transmitter 12 comprises one or more light sources 46, for example LEDs. The light emitted by the light source is collimated by means of a collimator optics 50 and is deflected by 90° with the aid of a transmitted light deflection optics 48.

The light receiver 14 comprises a light sensitive sensor, for example a linear sensor 58. Reception lenses 54A, 54B and a reception diaphragm 52 are arranged in front of the light receiver 14.

A reception space 28 in which two deflection elements 30, 32 are introduced is located between the light transmitter 12 and the light receiver 14, on the one hand, and the objective arrangement 18A, on the other hand, with the deflection element 30 being configured as a beam splitter and the deflection element 32 being configured as a deflection mirror. The deflection elements 30, 32 can selectively be introduced into or removed from the reception space 28. Provision can alternatively be made that the deflection elements 30, 32 can also e.g. be pivoted or raised out of the reception space 28 from the deflection position shown in FIG. 1 so that they are in a release position in which they do not influence the light paths.

The objective arrangement 1A is divided in the lateral direction, i.e. transversely to the transmitted light path 20, into a first objective region 34 and into a second objective region 356. A first lens element 38A is located in the first objective region 34 and, on the one hand, focuses transmitted light that propagates along the transmitted light path 20 in the direction of the monitored zone 16. The lens element 38A furthermore focuses received light that is reflected or remitted from the monitored zone 16 and that propagates along a received light path 24A in the direction of the beam splitter 30 inclined by 45° with respect to the transmitted light path 20 at which beam splitter 30 it is deflected by 90° in the direction of the deflection mirror 32. The deflection mirror 32 extending in parallel with the beam splitter 30 deflects the received light by 90° in the opposite direction so that it reaches the light receiver 14 along a part section 26 of the received light path 24A spaced apart in parallel from a part section 22 of the transmitted light path 20 that runs between the light transmitter 12 and the beam splitter 30.

The objective arrangement 18A comprises a second lens element 40A that is arranged laterally spaced apart from the first lens element 38A in its second objective region 36. Light that passes from the monitored zone 16 through the second objective region 36 along a further transmitted light path 24B through the objective arrangement 18A reaches the light receiver 14 without deflection with a deflection mirror 32 not introduced.

When the deflection elements 30, 32 are introduced into the reception space, the sensor system 10 is operated in an autocollimation configuration. Only that received light that propagates along the received light path 24A here actually also reaches the light receiver 14. Received light that propagates along the other received light path 24B is incident on the rear side of the deflection mirror 32 and thus does not reach the light receiver 14, but can rather be rendered harmless by suitable absorption means.

When the deflection elements 30, 32 are not introduced into the reception space 28 or have been pivoted or pushed out (not shown) of the reception space 28, the sensor system is in a biaxial configuration. Only that received light that propagates along the received light path 24B here reaches the light receiver 14. Received light that propagates over the received light path 24A is not deflected and thus also does not reach the light receiver 14, but rather propagates in the direction of the light transmitter 12 where it can be rendered harmless by suitable measures.

Both received light paths 24A, 24B coincide in the part section 26 between the light receiver 14 and the deflection mirror 32.

In the embodiment shown in FIG. 1, the objective arrangement 18A comprises a wedge element 44A that covers the two objective regions 34, 36. The wedge element 44A extends in wedge shape, i.e. one surface is inclined with respect to the transmitted light path 20, in the first objective region 34. In the second objective region 36, the wedge element 44A is configured as a plano-parallel plate, i.e. the two main boundary surfaces of the wedge element 44A run perpendicular to the received light path 24B in the second objective region 36. The transmitted light path 20 is deflected in the direction of the received light path 24B by the wedge-shaped section of the wedge element 44A, which is shown by a thinner line in FIG. 1. The transmitted light path 20 (and thus also the received light path 24A) intersects the received light path in the monitored region 16 outside the representation of FIG. 1 so that, on a configuration as a biaxial sensor, a signal attenuation due to the parallax error can be largely avoided.

In accordance with alternative embodiments, the wedge element 44A can be omitted or can also be configured as a component selectively introducible into the optical path.

FIG. 2 shows in accordance with an alternative embodiment a modified objective arrangement 18B that has a first lens element 38B and a second lens element 40B in a similar manner to the objective arrangement 18A (FIG. 1) that are arranged laterally offset from one another in the first and second objective regions 34, 36. A wedge element 44B is in turn provided that covers both objective regions 34, 36, but is only wedge-shaped in the first objective region 34. The lens elements 38B, 40B are, however, unlike the embodiment of FIG. 1, configured and arranged such that their optical axes 42A, 42B are offset inwardly toward one another, i.e. the spacing of the optical axes 42A, 42B of the lens elements 38B, 40B is smaller than the spacing of the optical axes of the transmitted light path 20 and of the received light path 24B. The extent of the transmitted light path and of the received light path 20, 24A, 24B is hereby additionally influenced such that they converge in the direction of the monitored zone 16 and intersect there. Due to the offset of both optical axes 42A and 42B with respect to the optical axes of the transmitted light path 20 (or of the received light path 24A) and of the received light path 24B, not only the transmitted light path 20 and the received light path 24A run at an angle in the monitored zone, but also the second received light path 24B of the pupil division arrangement. The optical paths within the objective arrangement 18B are only schematically indicated.

As can be recognized in FIG. 2, the optical axes 42A, 42B of both lens elements 38B, 40B are offset with respect to the optical axes of the associated light paths 20, 24A, 24B. Alternatively, such an offset can also only be provided with one of the lens elements 38B, 40B.

The total arrangement of FIG. 2 can also be configured as an integral component part.

In accordance with a further modification, the wedge element 44B can also be omitted so that the parallax compensation is effected solely by the offset between the optical axes of the lens elements 38B, 40B and the light paths 20, 24B.

Light-impermeable partition walls that are shown by way of example as thick continuous blocks can be provided between different regions of the sensor system 10.

The sensor system 10 in accordance with the invention can be converted with a small effort between an autocollimation configuration and a biaxial configuration and vice versa and is therefore universally usable. The effort of producing and stocking two separate sensor systems for specific respective applications of these configurations is thereby dispensed with, whereby a clear advantage in the manufacturing costs and distribution costs results.

It is not recognizable in FIG. 1, that in this embodiment the light sources 46 are arranged in a row along a straight line that is perpendicular to the plane of the Figure of FIG. 1. A linear scanning spot thus results perpendicular to this plane which is defined by those part sections of the transmitted light path and of the received light path which face the light transmitter 12 and the light receiver 14 respectively. A linear scanning spot produced in this manner extends in parallel with the inclination axis of the deflection element or elements 30, 32, i.e. in parallel with the axis by which the deflection element or elements 30, 32 is/are tilted with respect to the respective light path. As already described above prior to the description of the Figures for such a case, the dimension of the respective deflection element 30, 32 can be configured as ideally small in this manner since the dimension of the respective deflection element 30, 32 only has to be as large as the extent of the image of the linear scanning spot when incident on the deflection element without an inclination of the deflection element having to be considered in the selection of its dimension. A line-shaped reception element 58 advantageously likewise extends perpendicular to the plane of the Figure of FIG. 1.

FIG. 3 shows in a schematic representation and not to scale the optical components and optical paths of a modified embodiment in which the part sections 22 and 26 respectively of the transmitted light path 20 and of the received light path 24A, 24B respectively facing the light transmitter 12 and the light receiver 14 respectively are arranged perpendicular to one another. In this case, the sensor system can be operated in an autocollimation arrangement when the beam splitter 30 is used and not the deflection mirror 32. A pupil division system can be implemented n that the deflection mirror 32 is used (in a reverse orientation to the use in FIG. 1) and not the beam splitter 30. Since the beam splitter 30 and the deflection mirror 32 are used alternatively here, they are shown dashed in FIG. 3. The objective arrangement 18B in accordance with FIG. 2 can also be used instead of the objective arrangement 18A of FIG. 1 in an embodiment of FIG. 3. Otherwise, the arrangement of FIG. 3 corresponds to that of FIG. 1 so that corresponding reference numerals were used.

While it is possible to implement the beam splitter and the deflection mirror in one unit in an arrangement of FIG. 1 that is located either in the optical path (for an autocollimation arrangement) or not (for a pupil division arrangement), it is possible in an arrangement of FIG. 3 to use an element that is either used at the position of the beam splitter 30 (for an autocollimation arrangement) or at the position of the deflection mirror (for a pupil division arrangement).

The arrangements shown implement parallel or perpendicular optical paths in the sensor system, with this essentially being ensured by the parallel arrangement or possibility of use of the beam splitter and the deflection mirror. Different angles can e.g. be implemented by non-parallel orientations or orientation possibilities of the beam splitter and the deflection mirror.

REFERENCE NUMERAL LIST 10 sensor system
12 light transmitter
14 light receiver
16 monitored zone
18A, 18B objective arrangement
20 transmitted light path
22 part section of the transmitted light path
24A, 24B received light path
26 part section of the received light path
28 reception space
30 deflection element, beam splitter
32 deflection element, deflection mirror
34 first objective region
36 second objective region
38A, 38B first lens element
40A, 40B second lens element
42A, 42B optical axis
44A, 44B wedge element
46 light source
48 transmitted light deflection optics
50 collimator optics
52 reception diaphragm
54A, 54B reception lens
56 front screen
58 linear sensor

The invention claimed is:

1. An optoelectronic sensor system for detecting objects in a monitored zone, the optoelectronic sensor system comprising
a light transmitter for transmitting transmitted light into the monitored zone along a transmitted light path;
a light receiver for receiving received light from the monitored zone that is remitted along a received light path in the direction of the light receiver from an object to be detected in the monitored zone or from a reflector bounding the monitored zone; and
an objective arrangement arranged in front of the light transmitter and the light receiver,
wherein the transmitted light path and the received light path extend spaced apart from one another at least in respective part sections which are facing the light transmitter and the light receiver respectively,
wherein the objective arrangement has a first objective region and a second objective region at least laterally spaced apart from the first objective region, with the transmitted light path running through the first objective region; and
wherein the sensor system has a reception space which is provided between the objective arrangement, on the one hand, and the light transmitter and the light receiver, on the other hand, and in which at least one deflection element can be selectively inserted which is configured to define the received light path such that it runs through the first objective region with the deflection element introduced and through the second objective region with the deflection element not introduced.

2. The optoelectronic sensor system in accordance with claim 1,
wherein at least those part sections of the transmitted light path and of the received light path that face the light transmitter and the light receiver respectively extend spaced apart from one another.

3. The optoelectronic sensor system in accordance with claim 2,
wherein at least those part sections of the transmitted light path and of the received light path that face the light transmitter and the light receiver respectively extend spaced apart from one another extend either in parallel with one another, at an angle to one another, or at a right angle from one another.

4. The optoelectronic sensor system in accordance with claim 1, wherein the transmitted light path and the received light path coincide in the region of the objective arrangement and in the monitored zone when the at least one deflection element is introduced into the reception space.

5. The optoelectronic sensor system in accordance with claim 1,
wherein the sensor system comprises at least one deflection element that can be selectively inserted into the reception space.

6. The optoelectronic sensor system in accordance with claim 1,
wherein the sensor system comprises at least one deflection element that is movable between a deflection position and a release position and that is introduced into the reception space in the deflection position and releases the reception space in the release position.

7. The optoelectronic sensor system in accordance with claim 6,
wherein the at least one deflection element is pivotable or displaceable between the deflection position and the release position.

8. The optoelectronic sensor system in accordance with claim 1,
wherein the deflection element is configured as a beam splitter mirror that is configured to transmit the transmitted light in a substantially uninfluenced manner and to deflect the received light by an angle.

9. The optoelectronic sensor system in accordance with claim 8,
wherein a further deflection element configured as a deflection mirror is provided in addition to the deflection element configured as a beam splitter mirror.

10. The optoelectronic sensor system in accordance with claim 1,
wherein the objective arrangement has a first focusing lens element in the first objective region and has a second focusing lens element in the second objective region, with the lens elements having optical axes spaced apart from one another.

11. The optoelectronic sensor system in accordance with claim 10,
wherein the transmitted light path and the received light path run along respective optical axes, with the lens elements being arranged with respect to one another such that the spacing of the optical axes of the lens elements is smaller than the spacing of the optical axes of the transmitted light path and of the received light path in the region of the objective arrangement.

12. The optoelectronic sensor system in accordance with claim 1,
wherein the objective arrangement comprises at least one optical wedge element that is associated with the first objective region or with the second objective region and which is configured to deflect the transmitted light path or the received light path such that the transmitted light path and the received light path intersect within the monitored zone.

13. The optoelectronic sensor system in accordance with claim 1,
wherein the optoelectronic sensor system is configured to generate a linear scanning spot in the monitored zone; and wherein the light receiver is configured to detect an image of the scanning spot remitted by an object.

14. The optoelectronic sensor system in accordance with claim 13,
wherein the linear scanning spot extends perpendicular to a plane that is defined by the part sections of the transmitted light path and of the received light path that face the light transmitter and the light receiver respectively.

15. An optoelectronic sensor system for detecting objects in a monitored zone, the optoelectronic sensor system comprising
a light transmitter for transmitting transmitted light along a transmitted light path into the monitored zone;
a light receiver for receiving received light from the monitored zone that is remitted along a received light path in the direction of the light receiver from an object to be detected in the monitored zone or from a reflector bounding the monitored zone; and
an objective arrangement arranged in front of the light transmitter and the light receiver,
wherein the transmitted light path and the received light path extend spaced apart from one another at least in respective part sections which are facing the light transmitter and the light receiver respectively,
wherein the optoelectronic sensor system is configured to generate a linear scanning spot in the monitored zone and the light receiver is configured to detect an image of the scanning spot remitted by an object;
wherein the objective arrangement has a first objective region and a second objective region at least laterally spaced apart from the first objective region, with the transmitted light path running through the first objective region; and wherein the optoelectronic sensor system has at least one deflection element between the objective arrangement, on the one hand, and the light transmitter and the light receiver, on the other hand, which deflection element is configured to define the received light path such that it runs through the first objective region, with the linear scanning spot extending perpendicular to a plane that is defined by the part sections of the transmitted light path and of the received light path that face the light transmitter and the light receiver respectively.

16. The optoelectronic sensor system in accordance with claim 15,
wherein the light receiver is configured to detect the image of the scanning spot with spatial resolution.

17. An optoelectronic sensor system for detecting objects in a monitored zone, the optoelectronic sensor system comprising
a light transmitter for transmitting transmitted light into the monitored zone along a transmitted light path;
a light receiver for receiving received light from the monitored zone that is remitted along a received light path in the direction of the light receiver from an object to be detected in the monitored zone or from a reflector bounding the monitored zone; and
an objective arrangement arranged in front of the light transmitter and the light receiver,
wherein the transmitted light path and the received light path extend spaced apart from one another in respective part sections facing the light transmitter and the light receiver respectively;
wherein the optoelectronic sensor system has at least one deflection element between the objective arrangement, on the one hand, and the light transmitter and the light receiver, on the other hand;
wherein the optoelectronic sensor system is configured to generate a linear scanning spot in the monitored zone and the light receiver is configured to detect an image of the scanning spot remitted by an object; and wherein the linear scanning spot extends perpendicular to a plane that is defined by the part sections of the transmitted light path and of the received light path that face the light transmitter and the light receiver respectively.

18. The optoelectronic sensor system in accordance with claim 17, wherein the light receiver is configured to detect the image of the scanning spot with spatial resolution.

19. The optoelectronic sensor system in accordance with claim 17, wherein at least those part sections of the transmitted light path and of the received light path that face the light transmitter and the light receiver respectively extend either in parallel with one another, at an angle to one another, or at a right angle from one another.

20. The optoelectronic sensor system in accordance with claim 17, wherein the transmitted light path and the received light path coincide in the region of the objective arrangement and in the monitored zone.

21. The optoelectronic sensor system in accordance with claim 17, wherein the deflection element is configured as a beam splitter that is configured to transmit the transmitted light in a substantially uninfluenced manner and to deflect the received light by an angle.

22. The optoelectronic sensor system in accordance with claim 21, wherein a further deflection element configured as a deflection mirror is provided in addition to the deflection element configured as a beam splitter mirror.

* * * * *